United States Patent [19]

Wright et al.

[11] Patent Number: 4,692,177
[45] Date of Patent: Sep. 8, 1987

[54] SIMPLIFIED AIR FILTER

[75] Inventors: Allen B. Wright, Coventry, R.I.; Willard L. Chichester, Battle Creek, Mich.

[73] Assignee: Allied Corporation, Morristown, N.J.

[21] Appl. No.: 939,642

[22] Filed: Dec. 5, 1986

Related U.S. Application Data

[63] Continuation of Ser. No. 773,279, Sep. 6, 1985, abandoned.

[51] Int. Cl.⁴ ............................................. B01D 46/52
[52] U.S. Cl. ...................................... 55/499; 55/501; 55/503; 55/511; 55/521
[58] Field of Search ................. 55/497, 499, 501, 503, 55/504, 507, 511, 521, DIG. 28

[56] References Cited

U.S. PATENT DOCUMENTS

| 1,474,412 | 11/1923 | Dollinger | 55/521 X |
|---|---|---|---|
| 1,774,352 | 8/1930 | Bull | 55/DIG. 28 X |
| 1,829,401 | 10/1931 | Kamrath | |
| 1,983,866 | 12/1934 | Mikulasek | 55/504 X |
| 3,031,026 | 4/1962 | Price | 181/54 |
| 3,231,249 | 1/1966 | Kalert, Jr. | 55/DIG. 28 X |
| 3,252,580 | 5/1966 | Getzin | 55/503 X |
| 3,552,103 | 1/1971 | Smith | 55/486 |
| 3,680,287 | 8/1972 | Wood et al. | 55/524 |
| 3,693,410 | 9/1972 | Robrecht et al. | 73/28 |
| 3,712,033 | 1/1973 | Gronholz | 55/493 |
| 3,785,129 | 1/1974 | Szmutko | 55/419 |
| 3,796,027 | 3/1974 | Gumtow | 55/502 |
| 3,803,817 | 4/1974 | Lewis | 55/521 X |
| 4,130,405 | 12/1978 | Akado et al. | 55/503 |
| 4,133,661 | 1/1979 | Strnad | 55/497 |
| 4,236,901 | 12/1980 | Kato et al. | 55/276 |
| 4,350,509 | 9/1982 | Alseth et al. | 55/337 |
| 4,386,948 | 6/1983 | Choksi et al. | 55/499 |
| 4,438,057 | 3/1984 | Sundseth | 55/497 X |
| 4,552,574 | 11/1985 | Hotta | 55/503 X |

FOREIGN PATENT DOCUMENTS

| 2034670 | 1/1972 | Fed. Rep. of Germany | 55/521 |
|---|---|---|---|
| 2333719 | 1/1974 | Fed. Rep. of Germany | 55/497 |
| 1030447 | 6/1953 | France | 55/521 |

Primary Examiner—Kathleen J. Prunner
Attorney, Agent, or Firm—Ken C. Decker; William N. Antonis

[57] ABSTRACT

An air cleaner assembly includes a pair of molded housing members, each of which include four side walls and an open end. The opposite end of one of the members carries an outlet tube for connection to the air intake system of the vehicle, and the opposite end of the other member includes a lattice-work structure defining openings to admit air into the air cleaner assembly. The two housings snap together by receiving the side walls of the one member into the open end of the other member, and the members defining the lattice-work structure engage a panel cartridge filter assembly to force the latter into an adhesive carried in a groove extending around a flange defined on the one member.

8 Claims, 1 Drawing Figure

U.S. Patent  Sep. 8, 1987  4,692,177
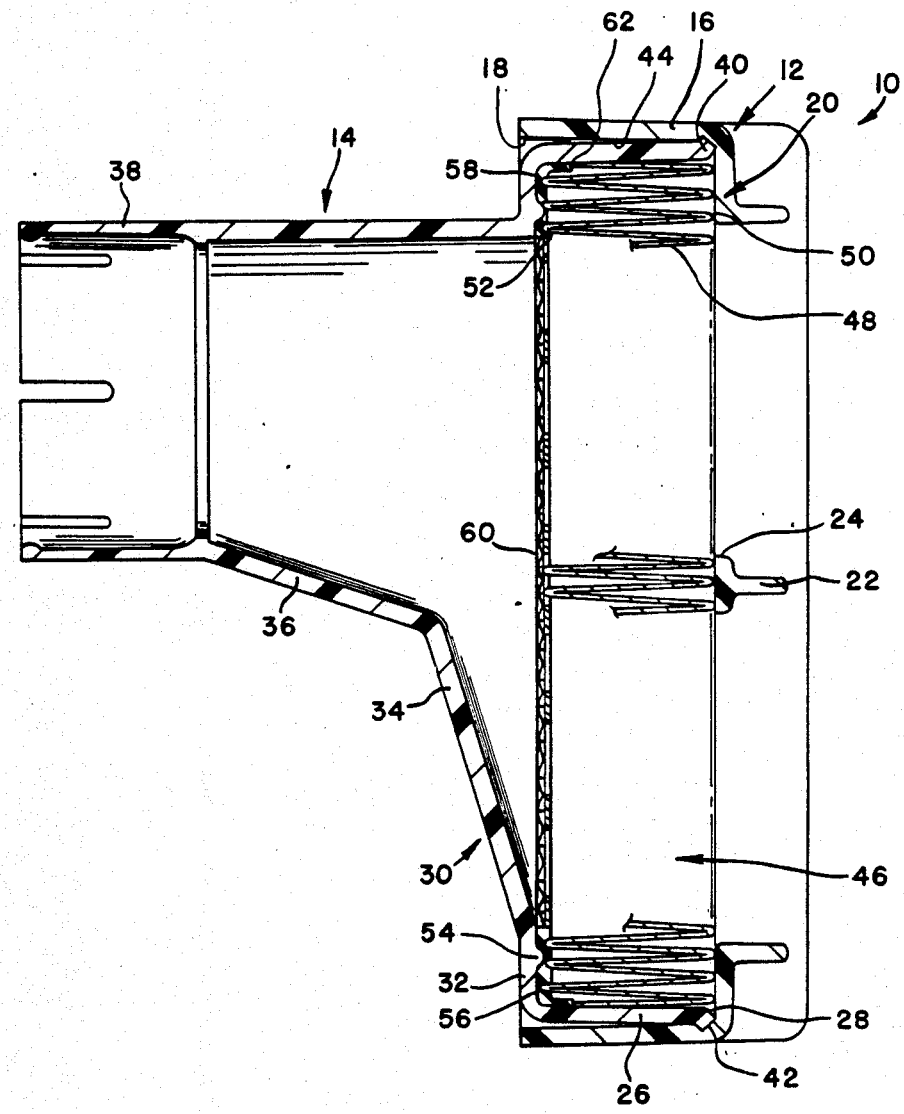

SIMPLIFIED AIR FILTER

This is a continuation of co-pending application Ser. No. 773,279 filed Sept. 6, 1985, and now abandoned.

This invention relates to a fluid filter, and more particularly to a filter for filtering inlet air to an internal combustion engine.

In vehicles using a relatively small gasoline engine, such as lift trucks and similar equipment, it is desirable to use a relatively small, inexpensive panel filter assembly in which the entire filter assembly is discarded when dirty and replaced with a new filter assembly. The housing for such an assembly must be relatively small and inexpensive, but must be strong and air tight in order to properly provide filtered air to the engine. Filters of this type are known in the prior art. For example, U.S. Pat. No. 3,712,033 discloses such a throwaway filter assembly. However, the housing of the filter disclosed in this patent is relatively complicated, and requires several parts and a complicated assembly procedure. The panel filter cartridge used in the filter is similarly complicated, and requires inner and outer screens to protect the filter element.

Accordingly, the present invention provides such a disposable, throwaway air cleaner which requires only four parts, one of which is the panel filter cartridge. The housing consists of two molded housing members, which are snap-fitted together when the air cleaner is assembled. Due to the minimal number of parts, the filter disclosed herein may be manufactured very inexpensively, yet is sufficiently strong and air tight to properly filter the engine inlet air. The housing members are preferably made of molded plastic, thus permitting an inexpensive, yet strong, air filter assembly.

These and other features and advantages of the invention will become apparent from the following description, with reference to the accompanying drawing, the sole FIGURE of which is a longitudinal cross sectional view taken through an air cleaner made pursuant to the teachings of our present invention.

Referring now to the drawing, an air cleaner assembly generally indicated by the numeral 10 includes molded housing members generally indicated by the numerals 12 and 14. The housing members 12, 14 are preferably molded from a high-impact plastic or a thermoplastic with a relatively high flex modulus, which results in a relatively strong, yet relatively inexpensive structure. Housing member 12 comprises four integral side walls 16 which define an open end 18 and an opposite end wall 20 consisting of cross members 22 which cooperate with one another to define a lattice-work structure with openings 24 between the cross members 22 to permit entry of air to be filtered into the air cleaner housing. The housing member 14 includes four side walls 26 which are complimentary to the side walls 16, and which cooperate to define an open end 28 and an opposite end wall generally indicated by the numeral 30. The end wall 30 includes a perimetrically extending flange portion 32 which extends all the way around the four side walls 26, and tapered sections 34, 36 which taper inwardly from the flange portion to define an outlet tube 38. The outlet tube 38 is adapted to be connected to the air horn of the vehicle engine, either directly or through an inlet hose. The outlet tube 38 is constructed so that it can be connected to either through a conventional hose clamp and automatically effects an air-tight seal.

The open end 18 of the housing member 12 receives the four side walls 26 of the housing member 14 when the housing members 12 and 14 are assembled. Detent means comprising an outwardly projecting detent 40 and a correspondingly shaped recess 42 are provided to fasten the housing members together. The outwardly projecting detent 40 extends around a very short portion of each of the side walls 26 adjacent each of the corners defined at the juncture of the side walls 26 and snaps into a correspondingly-shaped recess 42 in the side walls 16 when the housings are assembled. The natural resiliency of the materials from which the housings are made permit the side walls 16 to deflect and/or distort somewhat to permit the detents to ride up the inner surface 44 thereof when the housing members are assembled to permit the detents 40 to snap into their corresponding grooves 42. Accordingly, when the housing members are assembled, the side walls and end walls of the housing members cooperate to define a box-like compartment which receives a panel air filter cartridge generally indicated by the numeral 46. The panel cartridge 46 consists of a longitudinal array of tapered pleats generally indicated by the numeral 48. The pleats 48 are made of a pleated filter paper, which is pleated by conventional techniques well known to those skilled in the art. The ends of the pleats 48 (not shown) are end-sealed by an again conventional technique to prevent the air to be filtered from bypassing the pleats. The pleats 48 taper between outer tips 50 and inner tips 52. The distance between the planes defined by the outermost portions of the tips 50 and the outermost portions of the tips 52 is such that the outermost portions of the tips 50 are engaged by the cross members 22 and the outermost portions of the tips 52 engage the flange 32.

Referring to the flange portion 32 of the member 14, a perimetrically extending bead 54 runs along the flange 32 parallel to each of the side walls 26 and projects into the box-like compartment defined by the side walls 26 which receives the panel air filter cartridge 46. The bead 54 cooperates with each of the side walls 26 to define a groove 56 therebetween. Before the cartridge 46 is installed and before the housings 12, 14 are snapped together, an adhesive 58 is applied to the groove. The side of the bead 54 facing away from the groove 56 locates a screen 60 over the outlet tube 38.

Before the air cleaner assembly 10 is assembled, the adhesive 58 is dispensed in the groove 56, care being taken that the adhesive is dispensed completely around the flange 32. The cartridge assembly 46 is then located within the compartment defined by the walls 26, and the housing member 12 is then located over the open end 28 of the housing member 14. The housing member 12 is then forced to the left, viewing the FIGURE. As the housing member 12 is forced to the left, the detents 40 ride along the inner surface of the walls 16. At the same time, the members 22 engage the tips 50 of the pleats 48, so that the carriage assembly 46 is also urged to the left with the housing member 12. The depth of the cartridge assembly 46 is such that when the detents 40 snap into their grooves 42, the tips 52 of the cartridge assembly 46 embed into the adhesive 58, thereby forcing a portion of the adhesive indicated by the reference numeral 62 up the inner surface of the side wall 26 and forcing at least a portion of the adhesive 58 over the top of the bead 54 to thereby sealingly engage a small portion of the screen 60, to fasten both the cartridge assembly 46 and the screen 60 to the housing. Accordingly, adhesive 58 also seals the cartridge assembly 46 to the flange 32. The completed air cleaner assembly 10 can then be installed on a vehicle, with the outlet tube 38 being received in an inlet hose (not shown) communicated with the intake air opening of the vehicle engine, and with the tube 38 held to the hose by a conventional hose clamp (now shown). Accordingly, air is drawn through the openings 24 defined by the cross members 22, and is filtered in the conventional manner by passing through the pleats 48 of the panel cartridge assembly 46. The filtered air then passes through the screen 60 to the outlet tube 38. The screen 60 prevents movement of the pleats 48 toward the outlet tube 38 due to the force of air acting thereagainst.

We claim:

1. Fluid filter assembly comprising first and second molded housing members, said first housing member having integral side walls and an end wall connecting said side walls of the first housing member to define a structure having an open end, the second housing member having integral side walls and an end wall connecting said side walls of the second housing member to define a structure having an open end, the end wall of one of said housing members having structure defining openings to permit fluid flow therethrough, the end wall of said other housing member defining an outlet tube, the open end of said first housing member receiving the integral side walls of said second housing member, means joining said side walls of said housing members to assemble said members into a completed housing assembly, and a panel filter cartridge received within said housing assembly for filtering fluid communicated through said openings, said panel filter catridge comprising a longitudinal array of tapered pleats, said pleats tapering between surfaces on opposite sides of the panel filter cartridge defined by the tips of said pleats, said end walls of said housing members including portions engaging said pleats on corresponding sides of said panel filter cartridge to locate the latter in said housing assembly, said portion of said end wall of said other member engaging the pleats of the panel filter cartridge receives a perimetrically extending band of sealing adhesive extending around said last-mentioned end wall adjacent its corresponding side walls, the relative heights of said side walls and the depth of said pleats causing corresponding tips of said pleats to be forced into said sealing adhesive upon assembly of said members, and a perimetrically extending bead extending around the end wall of said other member and cooperating with the corresponding side walls of said other member to define a perimetrically extending groove therebetween for receiving said adhesive, said adhesive being constrained by said bead to be forced up a corresponding side wall as said pleats are forced into said adhesive.

2. Fluid filter assembly as claimed in claim 1, and a screen having edges extending across said other housing member, said bead cooperating with the edges of said screen to locate the latter relative to said corresponding side walls and said outlet tube.

3. Fluid filter assembly as claimed in claim 1 said joining means including detent means on the side walls of said one member cooperating with corresponding detent means on the side walls of the other housing member to secure said side walls together.

4. Fluid filter assembly as claimed in claim 3, wherein said side walls are resilient and said detent means includes detents on the side walls of said first housing member and corresponding grooves on the side walls of said other housing member, the resiliency of said side walls maintaining the projections in the grooves upon assembly of said housing members.

5. Fluid filter assembly as claimed in claim 1, wherein the openings in the end wall of said one housing member are defined by spaced-apart members defining a lattice structure of openings between said members, said members engaging the pleats on one side of said panel filter cartridge.

6. Fluid filter assembly comprising first and second molded housing members, said first housing member having integral side walls and an end wall connecting said side walls of the first housing member to define a box-like structure having an open end, the second housing member having integral side walls and an end wall connecting said side walls of the second housing member to define a box-like structure having an open end, the end wall of one of said members having structure defining openings to permit fluid flow therethrough, the end wall of said other housing member defining an outlet tube, the open end of said first housing member receiving the integral side walls of said second housing member, means joining said side walls of said members to assemble said members into a completed housing assembly, and a panel filter cartridge received within said housing assembly for filtering fluid communicated through said openings, said end walls of said housing members include portions engaging opposite sides of said panel filter cartridge to locate the latter within said housing assembly, the end wall of said other member receives an adhesive for sealing the cartridge against a portion of the end wall of said other housing member, the thickness of said cartridge causing the latter to be embedded in said adhesive when the cartridge is forced thereagainst during assembly of said housing assembly by engagement of the end wall of said one housing member with the side of said cartridge opposite the side of the cartridge embedded in the adhesive, and a perimetrically extending bead extends around the end wall of said other member and cooperating with the corresponding side walls of said other member to define a perimetrically extending groove therebetween for receiving said adhesive, said adhesive being constrained by said bead to be forced up a corresponding side wall as said pleats are forced into said adhesive.

7. Fluid filter assembly as claimed in claim 6, and a screen having edges extending across said other housing member, said bead cooperating with the edges of said screen to locate the latter relative to said corresponding side walls and said outlet tube.

8. Fluid filter assembly as claimed in claim 6, wherein the openings in the end wall of said one housing member are defined by spaced-apart members defining a lattice structure of openings between said spaced-apart members, said members engaging a surface on one side of said panel filter cartridge.

* * * * *